United States Patent Office 3,296,943
Patented Jan. 10, 1967

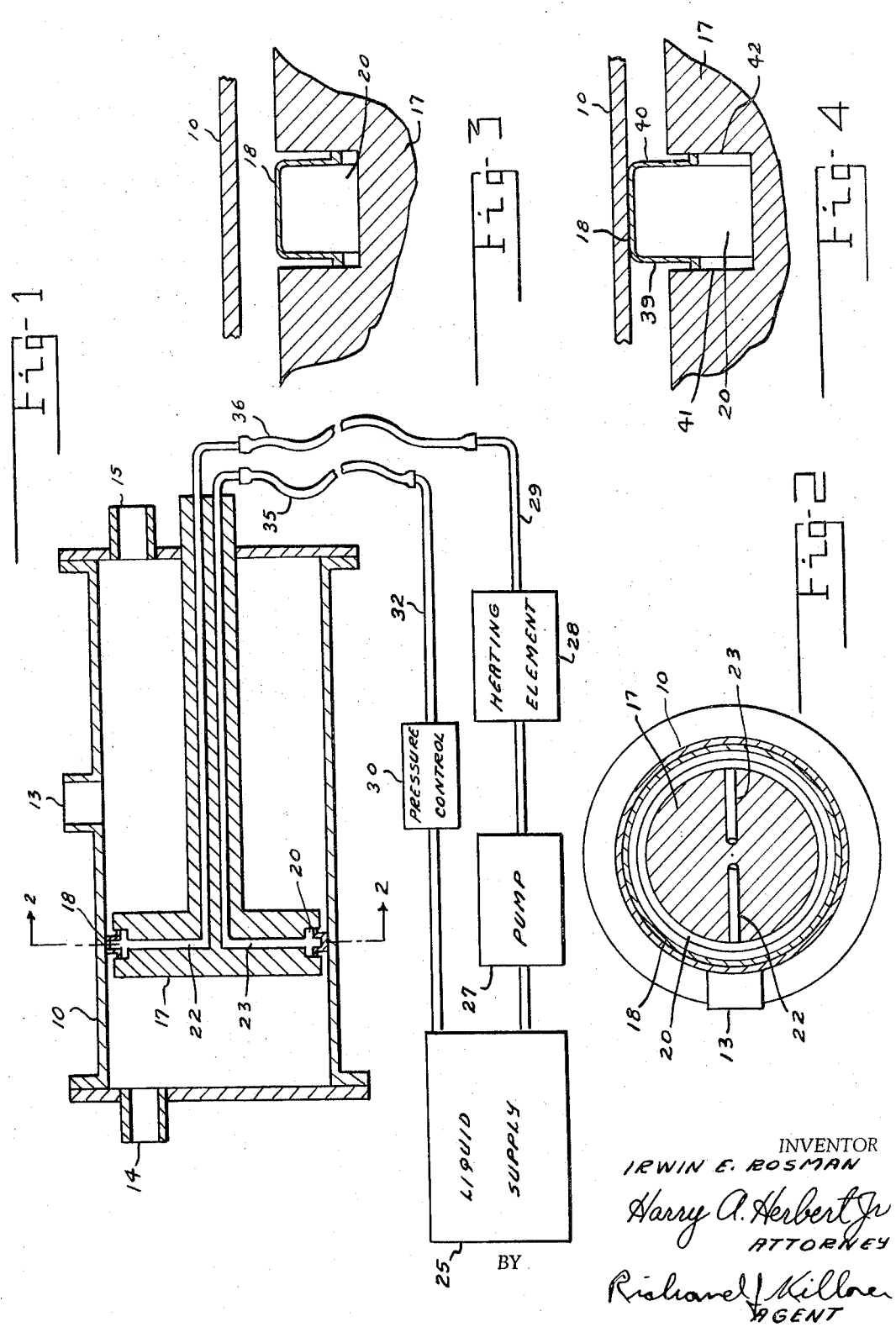

3,296,943
APPARATUS WITH A THERMALLY
ACTUATED SEAL
Irwin E. Rosman, Woodland Hills, Calif., assignor to the
United States of America as represented by the Secretary of the Air Force
Filed May 12, 1965, Ser. No. 455,353
2 Claims. (Cl. 92—111)

This invention relates to peripheral seals that utilize both temperature and pressure to effect sealing.

One object of the invention is to provide a seal which permits uniform contact on the sealing surface.

Another object of the invention is to provide a peripheral seal that will provide sealing for surfaces that may be slightly out of round.

These and other objects will be more fully understood from the following detailed description taken with the drawing wherein:

FIG. 1 is a schematic, showing partially in block form, of an apparatus providing a thermally actuated seal;

FIG. 2 is a sectional view of the device of FIG. 1 along the line 2—2;

FIG. 3 is an enlarged partial sectional view of the seal for the device of FIG. 1 in its unexpanded position in the groove; and FIG. 4 is an enlarged partial sectional view of the seal for the device of FIG. 1 in its expanded position in the groove.

Various types of peripheral seals made of elastomers or metals have been used to prevent the passage of fluid from one cavity to another. In the prior art, with seals of this type, having a substantially U-shaped cross section and which move in an annular groove in the piston, use has been made of pressure to expand the seal to provide the sealing. In these seals, complex arrangements have been used to provide substantially uniform sealing. According to this invention, use is made of both temperature and pressure to actuate the seal ring and thereby provide better sealing with a simple light-weight construction.

With reference to FIG. 1 of the drawing, reference character 10 shows a cylindrical chamber having ports 13, 14 and 15. This chamber could be used, for example, to supply liquid or gas to another chamber attached to port 13 from a supply attached at 14 and by exhausting between ports 13 and 15. Movement of the piston 17 determines whether there is communication between ports 13 and 14 or 13 and 15. An annular seal ring 18 of an elastomer or metal, depending on the use, is provided in an annular channel 20. Passageways 22 and 23 are provided for the supply and return of the seal operating liquid from supply 25 to the channel 20. The particular operating liquid would be determined by the use, but in some cases oil or water could be used. A pump 27 and heating element 28 are provided in line 29 to supply heated liquid to the channel 20 when sealing is desired. A pressure control 30 is provided in the return line 32 to control the pressure of the fluid applied to the seal. It is to be understood that for some uses a heating element could be provided adjacent the channel 20 in which case a flow of fluid may not be required. Also, it is to be understood that the pressure control could be designed into the system, such as by selecting the size of the feed and return lines, in which case no separate pressure control would be needed. Flexible connections 35 and 36 are provided to permit movement of the piston 17.

In the operation of the device of the invention with the piston 17 moved to its desired position and the seal 18 retracted into the channel 20 as shown in FIG. 3, and the pressure control set for the desired pressure, pump 27 and heating element 28 are energized, thus supplying the heated fluid to the channel 20. The heat and pressure cause the ring 18 to expand as shown in FIG. 4. The fluid pressure also acts to hold the seal walls 39 and 40 in contact with the groove side walls 41 and 42. When it is desired to move the piston 17, the heating element 28 is cut off. After cool fluid has had time to reach the chamber 20, pump 27 is cut off thus permitting seal 28 to retract into groove 20. The piston 17 is then free to be moved to the new position. Though no special liquid cooling means is shown, liquid cooling means could be provided if desired. Also, though not shown or described, automatic means may be provided for the various operations mentioned above. Also, the particular chamber shown is for the purpose of illustration only as many other uses for the seal will be obvious to those skilled in the art.

There is thus provided a peripheral seal that utilizes both temperature and pressure to effect sealing.

While certain specific embodiments have been described, it is obvious that numerous changes may be made without departing from the general principle and scope of the invention.

I claim:

1. An apparatus for providing a seal between a cylindrical wall and a piston within said cylindrical wall comprising a cylindrical chamber; a port in the cylindrical wall of said chamber; a piston within said chamber adapted to be positioned on either side of said port; an annular groove in the periphery of said piston; an annular seal within said groove; said seal having a substantially U-shaped cross section with the legs of the U extending into said groove; an annular projection on each of said legs projecting toward the sides of said groove; means for supplying a heated fluid under pressure into said groove adjacent said seal, to thereby provide expansion of said seal into sealing engagement with said cylindrical wall in response to the combined effect of heat and pressure.

2. An apparatus for providing a seal between a cylindrical wall and a piston within said cylindrical wall comprising said piston; an operating rod attached to said piston; an annular groove in the periphery of said piston; an annular seal within said groove; said annular seal having a substantially U-shaped cross section with the legs of the U extending into said groove; an annular projection on each of said legs projecting toward the sides of said groove; a supply passage and a return passage within said piston and said operating rod; a liquid supply; means for providing a flow of fluid under pressure from said liquid supply, through said supply passage into said groove adjacent said seal and back to said liquid supply through said return passage; and means for heating the fluid flowing into said supply passage to provide expansion of said seal into sealing engagement with said cylindrical wall in response to the combined effect of heat and pressure.

References Cited by the Examiner
UNITED STATES PATENTS

| 2,874,012 | 2/1959 | Stern | 92—182 |
| 3,043,325 | 7/1962 | Slawson | 137—112 |
| 3,062,553 | 11/1962 | Juzi | 277—15 |

FOREIGN PATENTS 749,695   5/1956   Great Britain.

MARTIN P. SCHWADRON, *Primary Examiner.*